United States Patent [19]
Duis

[11] Patent Number: 4,798,966
[45] Date of Patent: Jan. 17, 1989

[54] OPTICAL SENSOR ARRANGEMENT

[75] Inventor: Wilhelm Duis, Hetlingen, Fed. Rep. of Germany

[73] Assignee: J. D. Möller Optische Werke GmbH, Wedel, Fed. Rep. of Germany

[21] Appl. No.: 910,206

[22] Filed: Sep. 22, 1986

[30] Foreign Application Priority Data
Oct. 16, 1985 [DE] Fed. Rep. of Germany ....... 3536853

[51] Int. Cl.4 ............................................. H01J 40/14
[52] U.S. Cl. ................................. 250/578; 358/213.28
[58] Field of Search ............................... 250/578, 209; 358/213.23, 213.26, 213.27, 213.28, 107

[56] References Cited
U.S. PATENT DOCUMENTS 4,065,788 12/1977 Meier et al. ..................... 358/213.28
4,310,850 1/1982 Casler, Jr. ........................... 358/107
4,585,947 4/1986 Liptay-Wagner et al. ......... 250/560

Primary Examiner—David C. Nelms
Assistant Examiner—Khaled Shami
Attorney, Agent, or Firm—Toren, McGeady & Associates

[57] ABSTRACT

A lower frequency clock signal is supplied to a CCD line sensor. The step-like test signal detected by a scanning circuit is converted by means of a defining circuit and supplied to an evaluation circuit. The position of a light bar on a sensor is accurately determined by comparison with a higher frequency clock signal.

6 Claims, 2 Drawing Sheets

OPTICAL SENSOR ARRANGEMENT

BACKGROUND OF THE INVENTION

The present invention relates to an optical sensor means according to the preamble of claim 1.

Such sensor means have a plurality of linearly arranged lightsensitive surfaces. In order to obtain a good resolution, the lightsensitive surfaces or sensor units, which are conventionally called pixels are closely juxtaposed. For example, 4096 pixels can be spaced by 10 $\mu$m. The resolution attainable with this arrangement is also 10 $\mu$m. However, in certain circumstances such a resolution is not satisfactory. Admittedly the resolution can be improved with the aid of an upstream connected optical system, but this leads to it no longer being possible to cover a range of 4096×10 $\mu$m, i.e. approximately 4 cm and instead the range is smaller by the magnification factor.

In order to achieve an improved resolution without using complicated and costly optical aids, several sensors can be displaced in parallel with one another and conventionally CCD sensors are used. They have a width of at least several mm, so that there is a risk of parallax errors, if several sensors are juxtaposed. In addition, with such sensors, a significant improvement to the resolution would mean an unacceptable time expenditure.

Another possibility of increasing the resolution consists of using only one CCD line sensor and to periodically move the same backwards and forwards e.g. by 5 $\mu$m, scanning taking place in each end position. However, it is then necessary to have very accurate and therefore very complicated mechanical drive means and this type of scanning also reduces the scanning rate. This can lead to speed problems in the case of time-critical applications, because one CCD sensor supplies one information per pixel in each scanning interval.

SUMMARY OF THE INVENTION

The problem of the present invention is therefore to provide a sensor means, in which the resolution can be significantly increased, without deteriorating the time behaviour and without additional time expenditure being necessary.

This problem is solved as discussed further hereinbelow. Advantageous further developments can be gathered from the subclaims.

It is particularly advantageous to provide a defining circuit between the scanning circuit and the evaluation circuit. As a result a digital signal with discrete values obtained in the evaluation circuit is converted into a second signal, which better corresponds to the true course of the light intensity at the sensor. Moreover, at the time of supplying to the evaluation circuit, the second signal is prepared for obtaining a higher resolution.

It is particularly advantageous that by applying a higher frequency clock signal to the evaluation circuit, a higher resolution is attainable without expensive additional circuitry measures. For producing a second, higher frequency clock signal, it is possible to use the frequency of an oscillator, the clock signal of the scanning circuit being produceable by frequency divisions from the clock signal of the evaluation circuit.

This leads to the particular advantage that the signals are synchronized with one another, so that a signal take-over or acceptance at clearly defined times is always ensured.

If e.g. a sharply focussed light bar is directed on to the sensor, a staircase or step-like signal is available at the output of the scanning circuit and its fundamental shape corresponds to the Gaussian function. As a result of the inventive signal conversion in the defining circuit, which can be looked upon e.g. as digital/analog conversion or as representing filtering, a signal can be produced from this step-like signal in the form of a Gaussian function and is supplied to the evaluation circuit. With particular advantage, the first signal is an analog signal obtained by the integration of the output signal of the scanning circuit.

In the evaluation circuit, said first signal is supplied to a comparator, which compares the said signal with a constant reference voltage and at a clearly defined time produces level transitions from logic O to 1 and vice versa. In the evaluation circuit, these level transitions are brought into a time relationship with the actual scanning process. For example, it is possible to use as a reference a strobe pulse provided for the scanning circuit.

The exact time period or cycle between the strobe pulse and the first level transition and/or the second level transition of the test signal is determined by means of the higher frequency clock signal of the evaluation circuit. This time period or cycle is proportional to the light beam position. It is particularly advantageous that in this way the position of the light beam can be more accurately determined than was hitherto possible, without separate circuitry expenditure being necessary. It has been found that this is possible according to the invention if the illumination and all operating parameters of the evaluation and scanning circuits are kept constant.

The inventively proposed solution makes it possible to simulate a sensor with a much large number of lightsensitive surfaces than the presently possible 4096 pixels according to the prior art. For example, the resolution can be improved by a factor of 10, i.e. to below 1 $\mu$m.

It is particularly advantageous if an integrating element with a given time constant is provided in the defining circuit. In principle, any possible type of intermediate value formation can be used between the constant values in adjacent given time intervals. However, if use is made of an integrating element with a predetermined time constant, it is e.g. possible to take account of the time delay introduced through the integrating element at the output side of the evaluating circuit.

Furthermore, the time constant of the integrating element can be matched to the frequency of the clock signal of the scanning circuit. Thus, it is possible to introduce a first signal, without amplitude jumps, into the evaluation circuit, without any measuring accuracy reduction having to be feared in the case of larger amplitude changes corresponding to sharp light intensity jumps.

It is particularly favourable if the second signal proportional to the light beam position is produced in a microprocessor, which can take account of the time lag caused by the integrating element.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
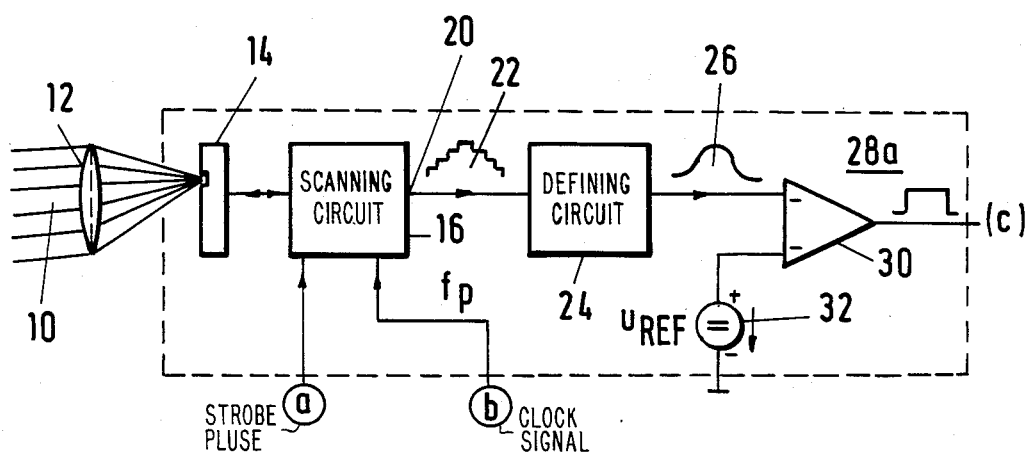
FIG. 1 A block circuit diagram of part of an embodiment of an inventive optical sensor means.

In the embodiment of part of a sensor means according to the invention shown in FIG. 1, a light beam 10 passes through a convergent lens 12 on to a sensor 14, which is constructed in this embodiment as a CCD line sensor. Sensor 14 has 4096 sensor units, which are juxtaposed in line-by-line manner. A scanning of the 4096 sensor units takes place in per se known manner by means of a scanning circuit 16.

For this purpose, a strobe pulse is applied across a connection a to the scanning circuit 16. Timed by a clock signal $f_p$, which is applied by means of a connection b to the scanning circuit 16, the latter successively scans the sensor units and supplies the output connection or terminal 20 with a first signal having the signal shape 22. The first signal is applied to a defining circuit 24, which converts it into signal shape 26. In signal shape 26, the first signal is supplied to an evaluation circuit, whose part 28a is shown in FIG. 1. Part 28a has a comparator 30 and a reference voltage source 32. Comparator 30 has an output connection or terminal c.

If the first signal introduced into the non-inverting input of comparator 30 has a higher amplitude than the reference voltage of reference voltage source 32, at the output c of comparator 30 there is a signal with logic level 1, otherwise there is a signal with logic level 0. The signal shape 26 essentially corresponds to a Gaussian function. The signal supplied by comparator 30 is therefore a square-wave signal, whose leading and falling edge is time-dependent on the ratio of the amplitude configuration of the Gaussian function and the magnitude of the reference voltage.

Figure 2:
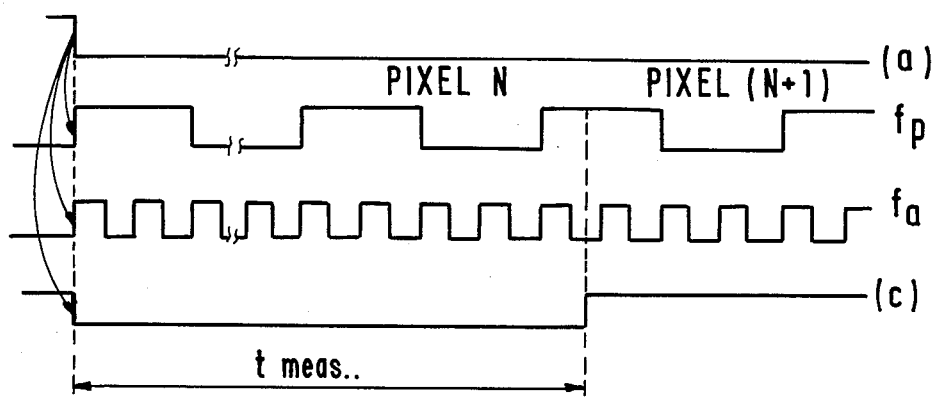
FIG. 2 A timing diagram for representing the time sequence of the clock signals, the test signal and the strobe pulse in the embodiment according to FIG. 1.

FIG. 2 shows the time succession of the signals provided according to the invention. The strobe pulse introduced into scanning circuit 16 at terminal a has a falling edge synchronizing with one another the first clock signal $f_p$, the second clock signal $f_a$ and the test or comparator signal at comparator output c. The strobe pulse has a period or cycle, which is at least as long as the 4096 periods or cycles of clock signal $f_p$, so that the latter can scan all 4096 sensor units.

Clock signal $f_a$ has a period or cycle, which is much shorter than that of clock signal $f_p$. In the represented embodiment the ratio of the frequencies of the clock signal is one to four. This ratio decides on the resolution increase brought about by the invention. Through the comparison of clock signal $f_p$ with the comparator signal at comparator output c, it can be established that the leading edge of the test pulse located there is in the range of the (n+1)th pixel. When transferred to the detected light bar, this means that the position of the light beam can be determined with an accuracy of 10 $\mu$m on selecting the aforementioned dimensions. Clock signal $f_p$ does not permit a more accurate determination of the position of the light bar.

Only through a comparison of the test pulse at output c of comparator 30 with a clock signal $f_a$ of the evaluation circuit is it possible to determine the light bar signal position more accurately by the factor $K=f_a/f_p$. Thus, for the present numerical example, a maximum resolution of 2.5 $\mu$m is obtained with $K=4$. It is obvious that the falling edge of the comparator signal can also be used for measurement purposes.

The part of the circuit shown in FIG. 1 can be combined with different parts 28b of the evaluation circuit. In the case of the embodiment shown in FIG. 3, there is a hold circuit 34 constructed e.g. as a flip-flop, which responds to the comparator signal at terminal c. The resetting input of hold circuit 34 is connected to input a for scanning circuit 16, to which the strobe pulse is applied. Thus, hold circuit 34 is set by the test pulse contained in the comparator circuit and is reset by the strobe pulse.

The output terminal of hold circuit 34 is connected to a microprocessor module 36. Through the comparison of the hold circuit signal with clock signal $f_a$, which is also applied to the microprocessor module 36 and whose edges can be counted in a simple manner in the microprocessor, it is possible to determine the time of the test pulse.

Clock signal $f_a$ is generated in a clock generator. As it is the highest frequency signal which occurs, it is advantageous to derive the clock signal $f_p$ and the strobe pulse from said signal. For this purpose a frequency divider 40 is used, which produces from the clock signal $f_a$ in per se known manner a signal with a four times longer period or cycle and this is used as the clock signal $f_p$ for the scanning circuit. A synchronizing circuit 42 is provided for producing the strobe pulse, producing the latter from clock signal $f_a$. Synchronizing circuit 42 and frequency divider 40 are matched to one another in such a way that the ratio of the periods of their output signals corresponds to the number of sensor units or pixels.

Figure 3:
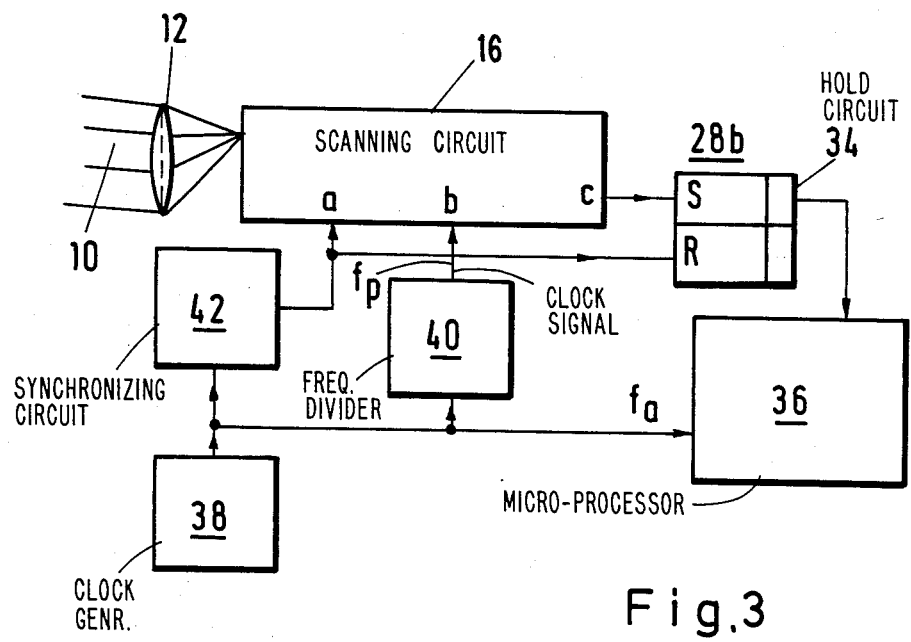
FIG. 3 A block circuit diagram of an embodiment of an inventive sensor means.
Figure 4:
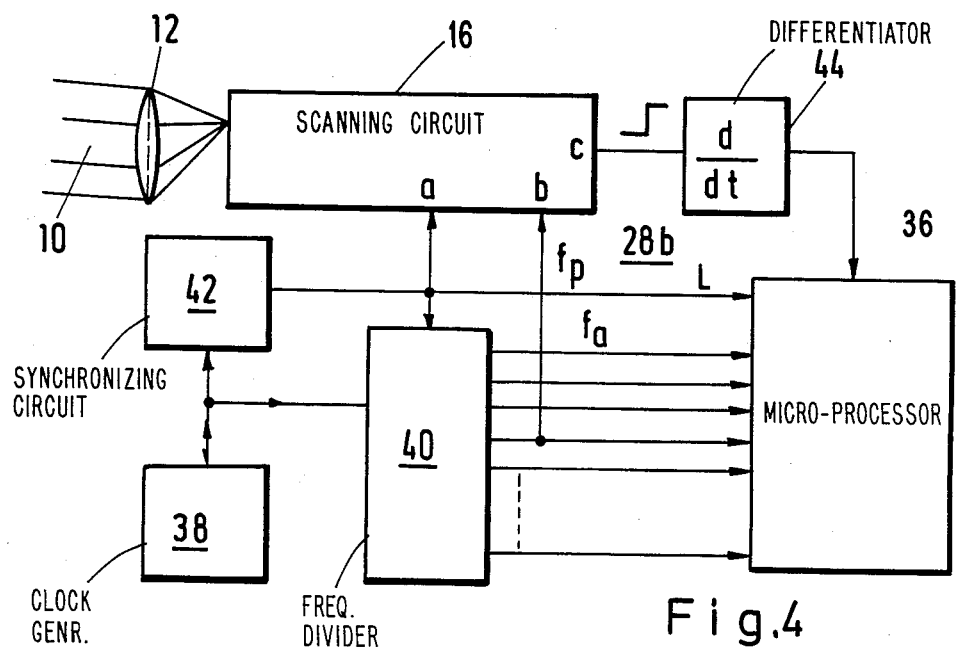
FIG. 4 A block circuit diagram of a further embodiment of an inventive sensor means.

Unlike in the embodiment shown in FIG. 3, in the embodiment of FIG. 4 the frequency divider 40 has a plurality of output connections or terminals, which give a parallel value in binary form. The logic levels at each output change continuously in response to the clock of clock generator 38, so that a counting process takes place. The signal at the LSB terminal corresponds in this case to clock signal $f_a$, whilst the clock signal $f_p$ is derived from output terminal with an 8-times longer period or cycle than the LSB terminal. In place of hold circuit 34, a differentiating element 44 is provided, which produces a clock pulse or strobe in response to the leading edge of the comparator signal. Since when this strobe occurs, there is a clearly defined numerical value at the parallel output of frequency divider 40, which is proportional to the time which has elapsed since the appearance of the strobe pulse, it is possible in this way to obtain a signal corresponding to the position of the light bar.

The strobe pulse produced by the synchronizing circuit 42 is additionally used in the embodiment according to FIG. 4 for resetting the counter in frequency divider 40. This signal is also used for resetting a not shown hold circuit, which is used for accepting the numerical value corresponding to the test pulse from the output of frequency divider 40.

It is obviously possible to use in place of the CCD line sensor a different sensor, particularly one having a plurality of sensor units in juxtaposed form.

What is claimed is:

1. An optical sensor arrangement comprising optical sensing means, including a plurality of identical sensor units arranged substantially equidistantly from one another in array;

means for issuing a clock signal;

a scanning circuit operative for scanning said sensor units and for producing a first signal in response to said clock signal in such a manner that the value of said first signal remains constant for a predetermined time interval following said clock signal;

defining means connected to said scanning circuit and receiving said first signal therefrom, said defining means including an integrating element and being operative for converting said first signal into a gradually changing converted signal having intermediate values between successive ones of the first signal values;

means for providing an additional clock signal having a frequency lower than that of said clock signal; and being connected to said scanning circuit; and an evaluation circuit receiving said converted signal from said defining means and operative for generating from said converted signal a second signal indicative of the position of a light beam on said optical sensing means, said evaluation circuit including a comparator which compares the value of the converted signal with that of a reference signal and means issuing an output signal that changes its value when the value of the converted signal exceeds the value of said reference signal.

2. The arrangement as defined in claim 1, wherein said evaluation circuit further includes a flip-flop having a setting input receiving said output signal of said comparator, a resetting input receiving said additional clock signal, and an output carrying said second signal.

3. The arrangement as defined in claim 1, wherein said evaluation circuit further includes a differentiator having an input receiving said output signal of said comparator, and an output carrying said second signal.

4. The arrangement as defined in claim 1 further including synchronizing means operative for synchronizing said additional clock signal with said clock signal.

5. The arrangement as defined in claim 4, wherein said issuing means includes a clock generator; and wherein said synchronizing means includes a counter having an input connected to said clock generator, and a plurality of outputs one issuing said clock signal and another one providing said additional clock signal, and synchronized with the firstmentioned clock signal.

6. The arrangement as defined in claim 1, wherein said scanning circuit scans said sensor units at a predetermined scanning frequency; and wherein said integrating element has a time constant which at least corresponds to said scanning frequency.

* * * * *